United States Patent
Tokunaga (10) Patent No.: US 7,068,931 B2
(45) Date of Patent: Jun. 27, 2006

(54) ALARM CONTROL SYSTEM AND METHOD

(75) Inventor: Koichi Tokunaga, Tokyo (JP)

(73) Assignee: NEC Corporation, Tokyo (JP)

( * ) Notice: Subject to any disclaimer, the term of this patent is extended or adjusted under 35 U.S.C. 154(b) by 746 days.

(21) Appl. No.: 10/132,389

(22) Filed: Apr. 26, 2002

(65) Prior Publication Data

US 2002/0159113 A1   Oct. 31, 2002

(30) Foreign Application Priority Data

Apr. 27, 2001   (JP)   ............................. 2001-133179

(51) Int. Cl.
*H04B 10/08*   (2006.01)
(52) U.S. Cl. ......................................... 398/14; 398/33
(58) Field of Classification Search .................. 398/32, 398/33, 11, 64, 17, 16, 18, 9, 37, 14
See application file for complete search history.

(56) References Cited

U.S. PATENT DOCUMENTS 5,500,756 A * 3/1996 Tsushima et al. ........... 398/181
5,995,256 A * 11/1999 Fee .............................. 398/34
6,081,359 A   6/2000 Takehana et al.

FOREIGN PATENT DOCUMENTS

| JP | 8-223253 A | 8/1996 |
| JP | 9-36827 A | 2/1997 |
| JP | 10-210008 A | 8/1998 |

* cited by examiner

*Primary Examiner*—Christina Y. Leung
(74) *Attorney, Agent, or Firm*—Foley & Lardner LLP (57) ABSTRACT

An alarm control method allowing easy localization of a failure in an optical communications network is disclosed. An optical signal from a signal transmitter is monitored to produce an alarm information signal indicating whether the optical signal is normally inputted. The optical signal and an optical control signal including the alarm information signal is multiplexed and transmitted to an optical receiver through an optical transmission line. When receiving the optical control signal and the optical signal from the optical transmitter, the optical receiver determines whether the optical signal is normally received. When not normally received, transmission of a receiver-side alarm signal to a management system is controlled depending on whether the alarm information signal indicates that the optical signal has been normally inputted at the optical transmitter.

16 Claims, 4 Drawing Sheets

ALARM CONTROL SYSTEM AND METHOD

BACKGROUND OF THE INVENTION

1. Field of the Invention

The present invention generally relates to an optical communications system and in particular to an alarm control method and system for an optical Wavelength-Division Multiplexing (WDM) communications network.

2. Description of the Related Art

For optical high-capacity communication networks using optical transmission lines (typically, optical fibers), Wavelength-Division Multiplexing (WDM) is the current favorite multiplexing technology since multiple WDM channels from different end users can be multiplexed on the same optical fiber. Accordingly, there have been widely used optical WDM communications systems, some of which have a management system for managing network elements including terminals and repeaters thereof.

It is assumed for simplicity that a source terminal transmits an optical WDM signal to a destination terminal through a repeater, which are connected to a management system through a management network. Each of the source and destination terminals has a failure detection function of detecting a failure for each WDM channel. When a failure on a WDM channel has been detected at the source terminal, the source terminal creates an alarm signal and transmits it to the management system through the management network. When having received the alarm signal from the source terminal, the management system indicates the occurrence of a failure at the source terminal with, for example, a corresponding indicator blinking on a display thereof.

Since an optical signal on the corresponding WDM channel is not received or erroneously received at the destination terminal, the destination terminal also creates an alarm signal and transmits it to the management system through the management network. When having received the alarm signal from the destination terminal, the management system indicates the occurrence of a failure at the destination terminal with, for example, a corresponding indicator blinking on the same display.

Accordingly, even when a failure occurs only at the source terminal, the management system receives a plurality of alarm signals from both the source and destination terminals and then notifies a network manager, by indicators blinking, of the occurrences of failures at both the source and destination terminals. The network manager cannot immediately localize the failure on the optical communications system. Further, two alarm signals are sent to the management system for a single failure, the amount of traffic in the management network is increased.

SUMMARY OF THE INVENTION

An object of the present invention is to provide alarm control system and method allowing easy localization of a failure in an optical communications network.

Another object of the present invention is to provide alarm control system and method which permits a single alarm signal to be issued for a single failure.

According to an aspect of the present invention, an alarm control method for an optical communications network in which a transmitting terminal transmits an optical signal to a receiving terminal through an optical transmission line, includes the steps of: at the transmitting terminal, a) inputting an optical signal from a signal transmitter; b) producing an alarm information signal indicating whether the optical signal is normally inputted; c) transmitting the optical signal and an optical control signal including the alarm information signal to the receiving terminal through the optical transmission line; at the receiving terminal, d) receiving the optical control signal and the optical signal from the transmitting terminal, e) determining whether the optical signal is normally received by a signal receiver; and f) when the optical signal is not normally received by the signal receiver, controlling transmission of a receiver-side alarm signal to the management system depending on whether the alarm information signal included in the optical control signal indicates that the optical signal has been normally inputted at the transmitting terminal.

The step (f) may include the stops of: when the alarm information signal indicates that the optical signal has not been normally inputted at the transmitting terminal, suppressing transmission of the receiver-side alarm signal to the management system; and when the alarm information signal indicates that the optical signal has been normally inputted at the transmitting terminal, transmitting the receiver-side alarm signal to the management system.

Further, at the transmitting terminal, when the optical signal is not normally inputted, a transmitter-side alarm signal may be transmitted to the management system.

According to anther aspect of the present invention, an alarm control method for an optical WDM (wavelength division multiplexing) communications network including a management network thereof, wherein a transmitting terminal transmits an optical WDM signal including a plurality of WDM channels to a receiving terminal through an optical transmission line, includes the steps of: at the transmitting terminal having a plurality of transmitters for producing a plurality of transmission signals on respective ones of the WDM channels; a) determining whether the transmission signals are normally inputted to a wavelength multiplexer; b) producing an alarm information signal indicating whether each of the transmission signals is normally inputted to the wavelength multiplexer; and c) multiplexing the plurality of transmission signals and a control signal including the alarm information signal to transmit them as an optical WDM signal to the receiving terminal through the optical transmission line; at the receiving terminal having a plurality of receivers for receiving a plurality of reception signals on respective ones of the WDM channels, d) determining whether each of the reception signals is normally received by a corresponding receiver; and e) when a receiver corresponding to a WDM channel does not normally receive a reception signal, controlling transmission of a receiver-side alarm signal to the management system depending on whether the alarm information signal included in the control signal indicates that a transmission signal on the WDM channel has been normally inputted to the wavelength multiplexer at the transmitting terminal, wherein the receiver-side alarm signal indicates whether each of the WDM channels normally operates in the receiving terminal.

The step (c) may include the steps of: when the alarm information signal indicates that the transmission signal on the WDM channel has not been normally inputted to the wavelength multiplexer at the transmitting terminal, suppressing transmission of the receiver-side alarm signal to the management system; and when the alarm information signal indicates that the transmission signal on the WDM channel has been normally inputted to the wavelength multiplexer at the transmitting terminal, transmitting the receiver-side alarm signal to the management system.

Further, at the transmitting terminal, when at least one of the transmission signals is not normally inputted to the wavelength multiplexer, a transmitter-side alarm signal may be transmitted to a management system, wherein the transmitter-side alarm signal indicates whether each of the WDM channels normally operates in the transmitting terminal.

According to still another aspect of the present invention, an optical communication system includes: a transmitting terminal; a receiving terminal; and a management system connected to the transmitting terminal and the receiving terminal, wherein the transmitting terminal includes: a signal transmitter for producing an optical signal; a multiplexer for multiplexing the optical signal and an optical control signal on an optical transmission line; and a transmission controller controlling such that the optical signal is monitored to produce an alarm information signal indicating whether the optical signal is normally inputted to the multiplexer, wherein the alarm information signal is inserted into the optical control signal, and the receiving terminal includes: a demultiplexer for demultiplexing a received optical signal to produce the optical control signal and the optical signal; a signal receiver for receiving the optical signal; a reception controller for determining whether the optical signal is normally received by the signal receiver; and an alarm controller controlling such that, when the optical signal is not normally received by the signal receiver, transmission of a receiver-side alarm signal to the management system is controlled depending on whether the alarm information signal included in the optical control signal indicates that the optical signal has been normally inputted at the transmitting terminal.

According to further another aspect of the present invention, an optical WDM (wavelength division multiplexing) communication system includes: a transmitting terminal; a receiving terminal; and a management system connected to the transmitting terminal and the receiving terminal, wherein the transmitting terminal includes: a plurality of transmitters for producing a plurality of transmission signals on respective ones of multiple WDM channels; a wavelength multiplexer for multiplexing the plurality of transmission signals and a control signal to transmit them as an optical WDM signal to the receiving terminal through an optical transmission line; a monitor for determining whether the transmission signals are normally inputted to the wavelength multiplexer; and a transmission controller for producing an alarm information signal indicating whether each of the transmission signals is normally inputted to the wavelength multiplexer, wherein the alarm information signal is included in the control signal, the receiving terminal includes: a demultiplexer for demultiplexing the optical WDM signal to produce a received control signal and a plurality of reception signals on respective ones of the WDM channels; a plurality of receivers for receiving respective ones of the reception signals; a reception controller for determining whether each of the reception signals is normally received by a corresponding receiver; and an alarm controller controlling such that, when a receiver corresponding to a WDM channel does not normally receive a reception signal, transmission of a receiver-side alarm signal to tho management system is controlled depending on whether the alarm information signal included in the received control signal indicates that a transmission signal on the WDM channel has been normally inputted to the wavelength multiplexer at the transmitting terminal, wherein the receiver-side alarm signal indicates whether each of the WDM channels normally operates in the receiving terminal.

As described above, when a failure such that an optical signal is not normally inputted occurs only at the transmitting terminal, the receiving terminal does not transmit the receiver-side alarm signal to the management system. Accordingly, the management system receives only the transmitter-side alarm signal from the transmitting terminal. In other words, a single alarm signal is permitted to be issued for a single failure. Since the management system notifies a network manager of occurrence of a failure at the transmitting terminal, easy localization of the failure can be achieved.

Further, in this case, the receiving terminal does not transmit the receiver-side alarm signal to the management system and therefore the amount of traffic in the management network can be reduced.

DETAILED DESCRIPTION OF THE PREFERRED EMBODIMENT

Optical WDM Communications System

Figure 1:
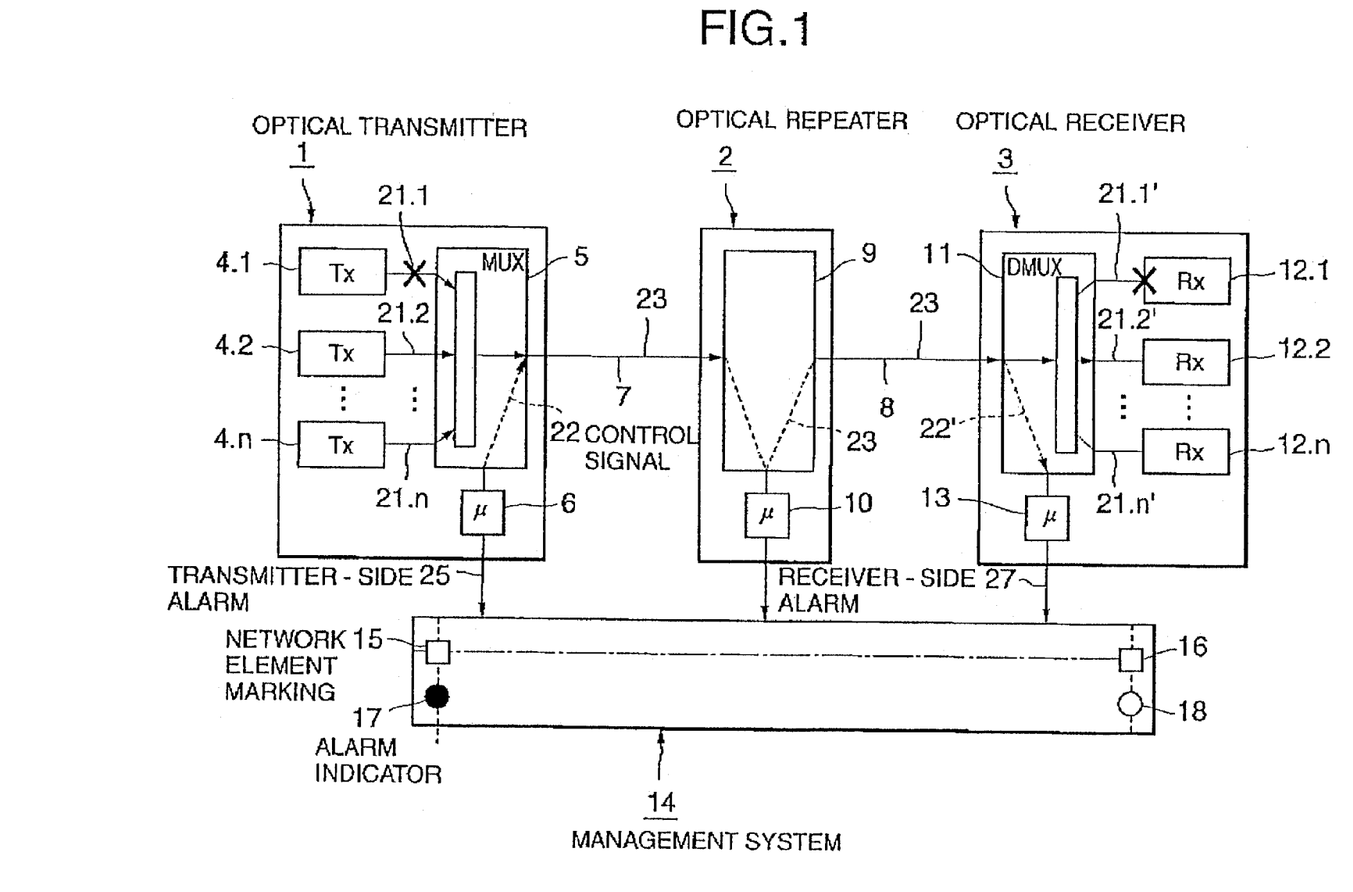
FIG. 1 is a block diagram showing an optical WDM communications system employing an alarm control method according to an embodiment of the present invention.

As shown in FIG. 1, it is assumed for simplicity that an optical transmitter 1 transmits an optical WDM signal to an optical receiver 3 through an optical repeater 2. The optical transmitter 1 and the optical repeater 2 are connected through an optical transmission line 7. The optical repeater 2 and the optical receiver 3 are connected through an optical transmission line 8. The optical transmitter 1, the optical repeater 2 and the optical receiver 3 are also connected to a management system 14 through a management network (not shown).

The optical transmitter 1 includes n signal transmitters 4.1–4.n (n is an integer greater than 1), which each output optical transmission signals 21.1–21.n to a wavelength multiplexer 5. The optical transmission signals 21.1–21.n have different wavelengths on respective ones of non-overlapping wavelength bands, each of which is assigned to a different WDM channel.

The optical transmitter 1 is further provided with a processor 6, which controls operations of the optical transmitter 1, including a failure detecting operation as described later. The processor 6 may be a program-controlled processor such as a central processing unit (CPU). The processor 6 creates a control signal 22 including, for example, an instruction to the repeater 2 and the optical receiver 3 to adjust the power level of an optical transmission signal.

Further, the processor 6 monitors the optical transmission signals 21.1–21.n to check whether all of them are normally inputted by the wavelength multiplexer 5. When at least one of the optical transmission signals 21.1–21.n is not normally inputted, the processor 6 creates a transmitter-side alarm signal 25 indicating which signal is not normally inputted, and transmits it to the management system 14.

Figure 2:
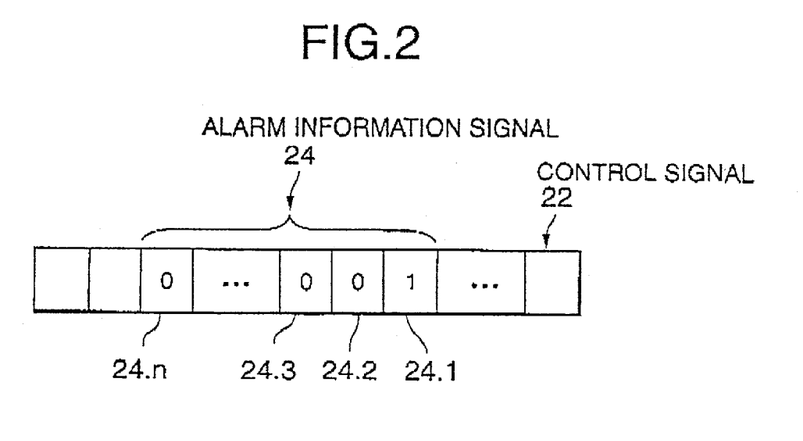
FIG. 2 is a diagram showing a control signal having an alarm information signal inserted therein, which is used in the embodiment of the present invention.

In addition, the processor creates an alarm information signal 24 composed of n alarm suppression flags 24.1–24.n, each of which indicates whether a corresponding optical transmission signal is normally inputted (see FIG. 2). The alarm information signal is inserted in the control signal 22 and then is transmitted to the optical receiver 3 as described later.

The wavelength multiplexer 5 multiplexes the optical transmission signals 21.1–21.n and the control signal 22 including the alarm information signal to produce an optical WDM signal 23 travelling through the optical transmission lines 7 and 8 to the optical receiver 3.

The optical repeater 2 includes a waveform-shaping and amplifying section 9 and a processor 10 that monitors and controls the waveform-shaping and amplifying section 9. The waveform-shaping and amplifying section 9 amplifies a received optical WDM signal that has been subject to attenuation due to propagation through the optical transmission line 7 and shapes the waveform of the received optical WDM signal before transmitting to the optical receiver 3.

The optical receiver 3 includes a wavelength demultiplexer 11, n signal receivers 12.1–12.n, and a processor 13, which may be a program-controlled processor. The wavelength demultiplexer 11 demultiplexes a received optical WDM signal 23 into optical reception signals 21.1'–21.n' and a control signal 22', which are substantially the same as those in the optical transmitter 1. The respective optical reception signals 21.1'–21.n' enter the signal receivers 21.1–12.n. The control signal 22' enters the processor 13. Based on the control signal 22', the processor 13 controls the whole operations of the optical receiver 3, including the alarm suppression operation, which will be described later.

The processor 13 monitors the optical reception signals 21.1'–21.n' to check whether they all normally enter respective ones of the signal receivers 21.1–12.n. When at least one of the optical reception signals 21.1'–21.n' does not enter normally, the processor 13 checks the alarm information signal 24 included in the control signal 22' to determine whether the abnormality of that optical reception signal is caused by the optical transmitter 1.

If the alarm information signal 24 includes no error-indicating flag for a corresponding WDM channel, it is determined that the abnormality of that optical reception signal is caused by the optical receiver 3. Accordingly, the processor 13 creates a receiver-side alarm signal 27 indicating which signal is not normally received, and transmits it to the management system 14.

On the other hand, if the alarm information signal 24 includes an error-indicating flag for the corresponding WDM channel, it is determined that the abnormality of that optical reception signal is caused by the optical transmitter 1. Accordingly, the processor 13 suppresses transmission of a receiver-side alarm signal 27.

The management system 14 includes, for example, a display which is provided with a plurality of network element markings 15, 16 (transmitter, repeater, and receiver) and alarm indicators 17, 18 corresponding to respective ones of the network element markings.

Preferably, the network element marking 15 indicates the first WDM channel (21.1) of the optical transmitter 1 and the network element marking 16 indicates the first WDM channel (21.1') of the optical receiver 3. When receiving a transmitter-side alarm signal 25 from the optical transmitter 1, the management system 14 drives the alarm indicator 17 to notify a network manager of occurrence of a failure at a WDM channel (e.g. 21.1) of the optical transmitter 1'. Similarly, when receiving a receiver-side alarm signal 27 from the optical receiver 3, the management system 14 drives the alarm indicator 18 to notify the network manager of occurrence of a failure at a WDM channel (hero, 21.1') of the optical receiver 3.

As described above, when a failure occurs only at the optical transmitter 1, the management system 14 receives only the transmitter-side alarm signal 25 from the optical transmitter 1, not from the optical receiver 3. Accordingly, the management system 14 activates only the alarm indicator 17 to notify the network manager of occurrence of a failure at the optical transmitter 1. Since the alarm indicator 18 corresponding to the optical receiver 3 is not activated, the network manager can easily localize the failure.

As an example, when a failure occurs in the signal transmitter 4.1 of the optical transmitter 1, the management system 14 receives only the transmitter-side alarm signal 25 indicating that the WDM channel of the signal transmitter 4.1 is faulty from the optical transmitter 1. Accordingly, the management system 14 activates only the alarm indicator 17 corresponding to the WDM channel (21.1) to notify the network manager of occurrence of a failure on the WDM channel (21.1) of the optical transmitter 1. Since the alarm indicator 18 corresponding to the counterpart of the optical receiver 3 is not activated, the network manager can easily localize the failure.

Alarm Suppression Flags

Referring to FIG. 2, an alarm information signal 24 is composed of n alarm suppression flags 24.1–24.n corresponding to respective ones of the optical signals 21.1–21.n. Each of the alarm suppression flags 24.1–24.n is set to 0 or 1. When an optical signal output by a signal transmitter is normally inputted to the optical multiplexer 5, a corresponding alarm suppression flag is set to 0. When the optical signal is not normally inputted to the optical multiplexer 5, the corresponding alarm suppression flag is set to 1.

In FIG. 2, the first alarm suppression flag 24.1 is set to 1 and the other flags are set to 0. Accordingly, it is possible to estimate that a failure occurs at the signal transmitter 4.1 and/or a corresponding signal line from the signal transmitter 4.1 to the optical multiplexer 5. Such an alarm information signal 24 is inserted in the control signal 22 and is transmitted to the optical receiver 3.

Figure 3:
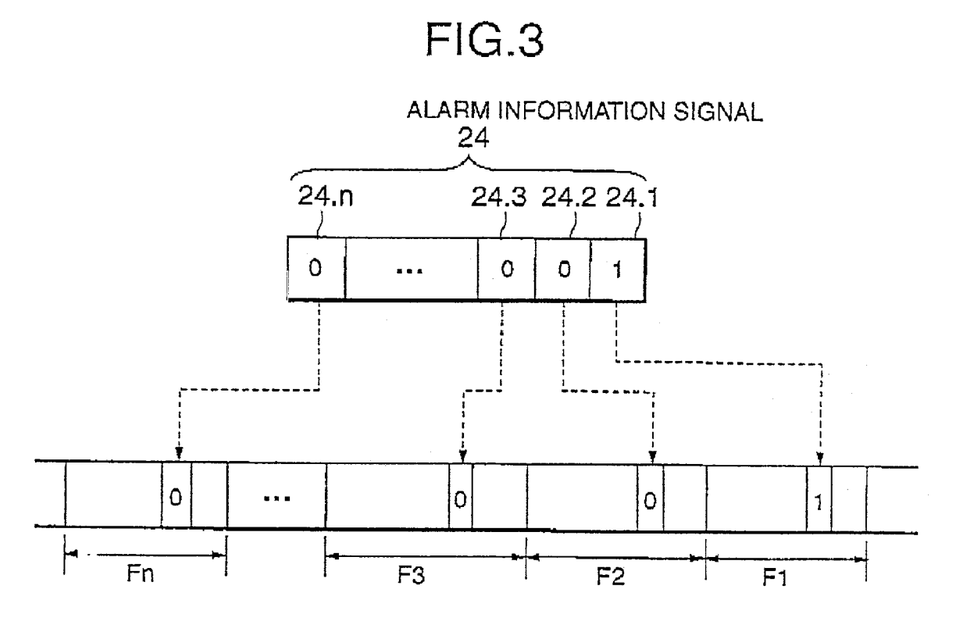
FIG. 3 is a a schematic diagram showing frames of a control signal, each of which has a single alarm suppression flag inserted therein.

As shown in FIG. 3, the alarm information signal 24 can be transmitted using a plurality of frames of the control signal 22. In this method, each of the alarm suppression flags 24.1–24.n is inserted in a corresponding one of consecutive frames F1–Fn of the control signal 22.

Such a divided alarm information signal transmission method allows easy installation of additional signal transmitter and receiver. When m additional pairs of signal transmitter and receiver are installed, an alarm information signal composed of n+m alarm suppression flags can be transmitted only using n+m consecutive frames of the control signal 22 without changing in frame format.

Transmitter Operation

Figure 4:
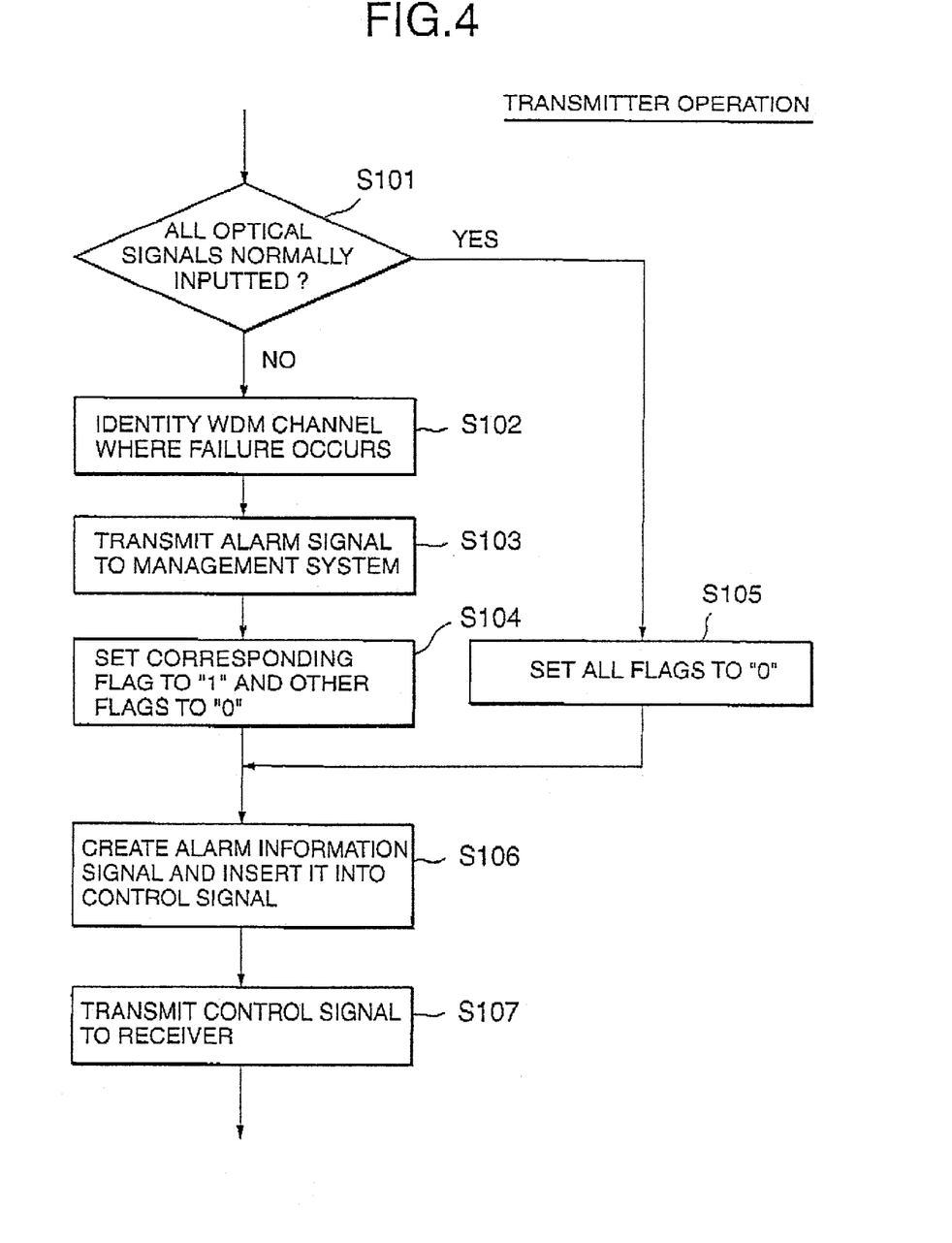
FIG. 4 is a flow chart showing an operation of an optical transmitter in the embodiment.

Referring to FIG. 4, the processor 6 determines whether all the optical transmission signals 21.1–21.n are normally inputted to the wavelength multiplexer 5 (step S101). When at least one of the optical transmission signals 21.1–21.n is not normally inputted (NO in step S101), the processor 6 identifies a WDM channel on which a failure occurs (step S102). After transmitting to the management system 14 a transmitter-side alarm signal 25 indicating which signal is not normally inputted (stop S103), the processor 6 sets an alarm suppression flag corresponding to the identified WDM channel to "1" and the other flags to "0" as shown in FIGS. 2 and 3 (step S104). On the other hand, when all the optical transmission signals 21.1–21.n are normally inputted (YES in step S101), the processor 6 sets all the alarm suppression flags to "0" (step S105).

Thereafter, the processor 6 creates an alarm information signal 24 from the optical transmission signals 21.1–21.n and inserts it into the control signal 22 as described in FIG. 2 or FIG. 3 (step S106). The control signal 22 including the alarm information signal 24 is transmitted to the optical receiver 3 (step S107).

For example, when only the optical signal 21.1 is not normally inputted to the optical multiplexer 5, the alarm information signal 24 has the alarm suppression flag 24.1 set to "1" and the other flags 24.2–24.n set to "0", as shown in FIG. 2. The transmitter-side alarm signal 25 indicating that the optical signal 21.1 is not normally inputted is transmitted the management system 14.

Receiver Operation

Figure 5:
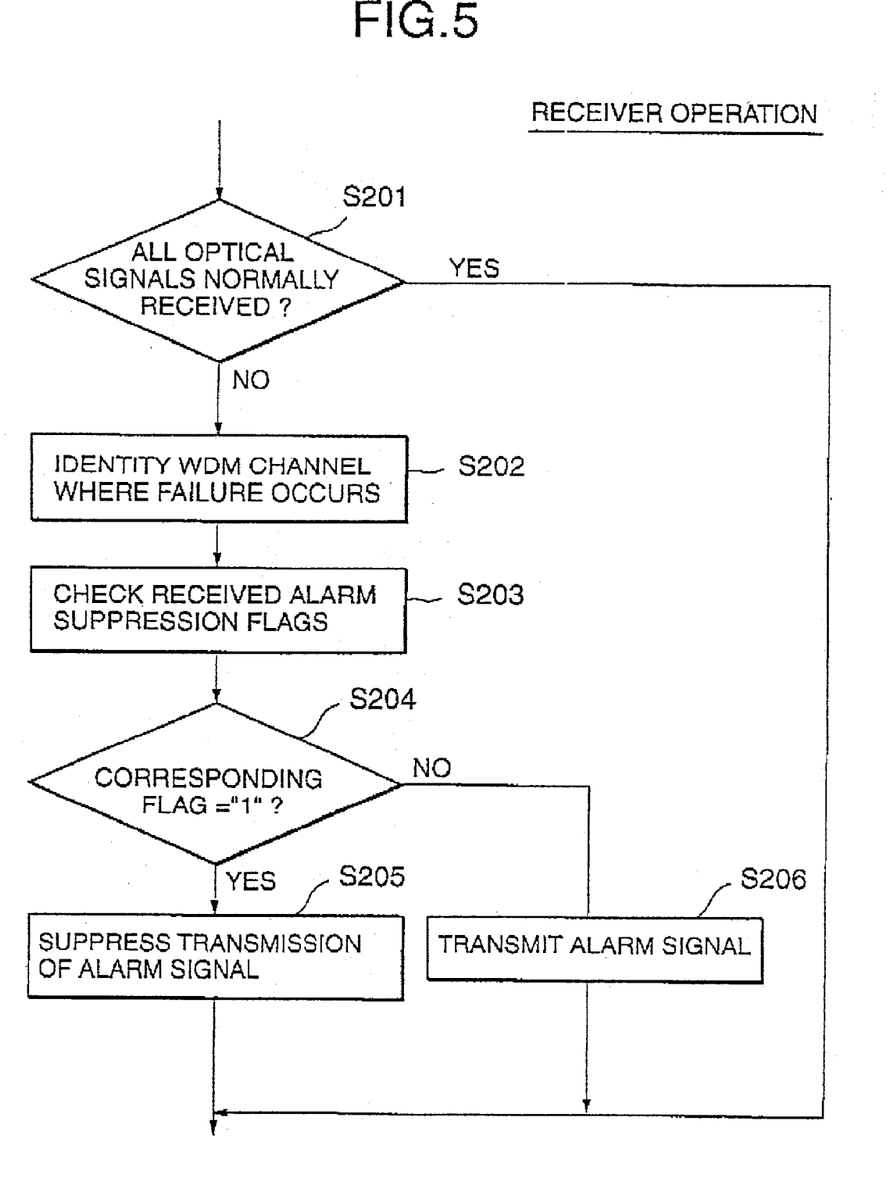
FIG. 5 is a flow chart showing an operation of an optical receiver in the embodiment.

Referring to FIG. 5, the processor 13 determines whether all the optical reception signals 21.1'–21.n' are normally inputted to respective ones of the signal receivers 12.1–12.n (step S201). When at least one of the optical reception signals 21.1'–21.n' is not normally inputted (NO in step S201), the processor 13 identifies a WDM channel on which a failure occurs (step S202) and checks the alarm information signal 24 included in a received control signal 22' (step S203). The processor 13 determined whether an alarm suppression flag corresponding to the WDM channel on which the failure occurs is set to "1" (step S204).

When the corresponding flag is set to "1" (YES in step S204), it is determined that the abnormality of that optical reception signal is caused by the optical transmitter 1, not by the optical receiver 3. Accordingly, the processor 13 suppresses transmission of a receiver-side alarm signal 27 (step S205). Since the transmission of a receiver-side alarm signal 27 is suppressed, the amount of traffic in the management network is reduced, resulting in efficient use of the network.

On the other hand, when the corresponding flag is set to "0" (NO in step S204), it is determined that the abnormality of that optical reception signal is caused by the optical receiver 3. Accordingly, the processor 13 transmits a receiver-side alarm signal 27 indicating which signal is not normally received, to the management system 14 (step S206).

For example, in the case where only an optical reception signal 21.1' (i=1, 2, ..., n) is not normally received and the received alarm information signal 24 has the alarm suppression flag 24.i set to "1" and the other flags set to "0", the processor 13 determines that the failure does not occur at the receiver side but the transmitter side. Therefore, the processor 13 does not transmit a receiver-side alarm signal 27 for the optical reception signal 21.i' to the management system 14. In this case, since the management system 14 does not receive the receiver-side alarm signal 27 for the optical reception signal 21.i' but the transmitter-side alarm signal 25 for the corresponding optical transmission signal 21.i, the alarm indicator 17 corresponding to the i-th WDM channel of the optical transmitter 1 starts blinking and the alarm indicator 18 corresponding to the counterpart of the optical receiver 3 does not blink. This allows the network manager to be plainly notified of the occurrence of a failure on the i-th WDM channel of the optical transmitter 1.

In addition, it is assumed that another optical reception signal 21.j' (j=1, 2, 3, ... n, but j≠i) is not normally inputted and the received alarm information signal 24 has a corresponding alarm suppression flag 24.j set to "0". In this case, the processor 13 determines that the failure does not occur at the transmitter side but the receiver side. Therefore, the processor 13 transmits a receiver-side alarm signal 27 indicating that the optical reception signal 21.j' is not normally inputted, to the management system 14. In this case, since the management system 14 does not receive the transmitter-side alarm signal 25 but the receiver-side alarm signal 27 for the j-th WDM channel, the alarm indicator 17 corresponding to the j-th WDM channel of the optical transmitter 1 does not blink and the alarm indicator 18 corresponding to the j-th WDM channel of the optical receiver 3 starts blinking. This allows the network manager to be plainly notified of the occurrence of a failure on the j-th WDM channel of the optical receiver 3.

What is claimed is:

1. An alarm control method for an optical communications network in which a transmitting terminal transmits an optical signal to a receiving terminal through an optical transmission line, comprising the steps of:
   at the transmitting terminal,
      a) inputting an optical signal from a signal transmitter;
      b) producing an alarm information signal indicating whether the optical signal is normally inputted;
      c) transmitting the optical signal and an optical control signal including the alarm information signal to the receiving terminal through the optical transmission line;
   at the receiving terminal,
      d) receiving the optical control signal and the optical signal from the transmitting terminal,
      e) determining whether the optical signal is normally received by a signal receiver; and
      f) when the optical signal is not normally received by the signal receiver, controlling transmission of a receiver-side alarm signal to a management system depending on whether the alarm information signal included in the optical control signal indicates that the optical signal has been normally inputted at the transmitting terminal,
   wherein the step (f) comprises the steps of:
      when the alarm information signal indicates that the optical signal has not been normally inputted at the transmitting terminal, suppressing transmission of the receiver-side alarm signal to the management system; and
      when the alarm information signal indicates that the optical signal has been normally inputted at the transmitting/terminal, transmitting the receiver-side alarm signal to the management system.

2. The alarm control method according to claim 1, further comprising the step of:
   at the transmitting terminal,
      when the optical signal is not normally inputted, transmitting a transmitter-side alarm signal to the management system.

3. An alarm control method for an optical WDM (wavelength division multiplexing) communications network including a management system thereof, wherein a transmitting terminal transmits an optical WDM signal including a plurality of WDM channels to a receiving terminal through an optical transmission line, comprising the steps of:
   at the transmitting terminal having a plurality of transmitters for producing a plurality of transmission signals on respective ones of the WDM channels, a) determining whether the transmission signals are normally inputted to a wavelength multiplexer;

b) producing an alarm information signal indicating whether each of the transmission signals is normally inputted to the wavelength multiplexer; and c) multiplexing the plurality of transmission signals and a control signal including the alarm information signal to transmit them as an optical WDM signal to the receiving terminal through the optical transmission line;

at the receiving terminal having a plurality of receivers for receiving a plurality of reception signals on respective ones of the WDM channels, d) determining whether each of the reception signals is normally received by a corresponding receiver; and e) when a receiver corresponding to a WDM channel does not normally receive a reception signal, controlling transmission of a receiver-side alarm signal to the management system depending on whether the alarm information signal included in the control signal indicates that a transmission signal on the WDM channel has been normally inputted to the wavelength multiplexer at the transmitting terminal, wherein the receiver-side alarm signal indicates whether each of the WDM channels normally operates in the receiving terminal, wherein the step (e) comprises the steps of:

when the alarm information signal indicates that the transmission signal on the WDM channel has not been normally inputted to the wavelength multiplexer at the transmitting terminal, suppressing transmission of the receiver-side alarm signal to the management system; and when the alarm information signal indicates that the transmission signal on the WDM channel has been normally inputted to the wavelength multiplexer at the transmitting terminal, transmitting the receiver-side alarm signal to the management system.

4. The alarm control method according to claim 3, further comprising the step of:

at the transmitting terminal, when at least one of the transmission signals is not normally inputted to the wavelength multiplexer, transmitting a transmitter-side alarm signal to the management system, wherein the transmitter-side alarm signal indicates whether each of the WDM channels normally operates in the transmitting terminal.

5. An optical communication system comprising:

a transmitting terminal;

a receiving terminal; and a management system connected to the transmitting terminal and the receiving terminal, wherein the transmitting terminal comprises:

a signal transmitter for producing an optical signal;

a multiplexer for multiplexing the optical signal and an optical control signal on an optical transmission line; and a transmission controller controlling such that the optical signal is monitored to produce an alarm information signal indicating whether the optical signal is normally inputted to the multiplexer, wherein the alarm information signal is inserted into the optical control signal, and the receiving terminal comprises:

a demultiplexer for demultiplexing a received optical signal to produce the optical control signal and the optical signal;

a signal receiver for receiving the optical signal;

a reception controller for determining whether the optical signal is normally received by the signal receiver; and an alarm controller controlling such that, when the optical signal is not normally received by the signal receiver, transmission of a receiver-side alarm signal to the management system is controlled depending on whether the alarm information signal included in the optical control signal indicates that the optical signal has been normally inputted at the transmitting terminal, wherein, when the alarm information signal indicates that the optical signal has not been normally inputted at the transmitting terminal, the alarm controller suppresses transmission of the receiver-side alarm signal to the management system; and when the alarm information signal indicates that the optical signal has been normally inputted at the transmitting terminal, the alarm controller transmits the receiver-side alarm signal to the management system.

6. The alarm control system according to claim 5, wherein the transmission controller of the transmitting terminal transmits a transmitter-side alarm signal to the management system when the optical signal is not normally inputted.

7. An optical WDM (wavelength division multiplexing) communication system comprising:

a transmitting terminal;

a receiving terminal; and a management system connected to the transmitting terminal and the receiving terminal, wherein the transmitting terminal comprises:

a plurality of transmitters for producing a plurality of transmission signals on respective ones of multiple WDM channels;

a wavelength multiplexer for multiplexing the plurality of transmission signals and a control signal to transmit them as an optical WDM signal to the receiving terminal through an optical transmission line;

a monitor for determining whether the transmission signals are normally inputted to the wavelength multiplexer; and a transmission controller for producing an alarm information signal indicating whether each of the transmission signals is normally inputted to the wavelength multiplexer, wherein the alarm information signal is included in the control signal, the receiving terminal comprises:

a demultiplexer for demultiplexing the optical WDM signal to produce a received control signal and a plurality of reception signals on respective ones of the WDM channels;

a plurality of receivers for receiving respcetive ones of the reception signals;

a reception controller for determining whether each of the reception signals is normally received by a corresponding receiver, and an alarm controller controlling such that, when a receiver corresponding to a WDM channel does not normally receive a reception signal, transmission of a receiver-side alarm signal to the management system is controlled depending on whether the alarm information signal included in the received control signal indicates that a transmission signal on the WDM channel has been normally inputted to the wavelength multiplexer at the transmitting terminal, wherein the receiver-side alarm signal indicates whether each of the WDM channels normally operates in the receiving terminal, wherein, when the alarm information signal indicates that the transmission signal on the WDM channel has not been normally inputted to the wavelength multiplexer at the transmitting terminal, the alarm controller suppresses transmission of the receiver-side alarm signal to the management system; and when the alarm information signal indicates that the transmission signal on the WDM channel has been normally inputted to the wavelength multiplexer at the transmitting terminal, the alarm controller transmits the receiver-side alarm signal to the management system.

8. The alarm control system according to claim 7, wherein the transmission controller of the transmitting terminal transmits a transmitter-side alarm signal to the management system when at least one of the transmission signals is not normally inputted to the wavelength multiplexer, wherein the transmitter-side alarm signal indicates whether each of the WDM channels normally operates in the transmitting terminal.

9. An optical transmitting terminal in an optical communication system comprising a receiving terminal and a management system connected to the transmitting terminal and the receiving terminal, comprising:

a plurality of transmitters for producing a plurality of transmission signals on respective ones of multiple WDM (wavelength division multiplexing) channels;

a wavelength multiplexer for multiplexing the plurality of transmission signals and a control signal to transmit them as an optical WDM signal to the receiving terminal through an optical transmission line;

a monitor for determining whether the transmission signals are normally inputted to the wavelength multiplexer; and a transmission controller for producing an alarm information signal indicating whether each of the transmission signals is normally inputted to the wavelength multiplexer, wherein the alarm information signal is included in the control signal, wherein the alarm information signal comprises a plurality of alarm suppression flags each corresnonding to the WDM channels, wherein the alarm suppression flags are inserted as one unit in a predetermined area of the control signal.

10. The optical transmitting terminal according to claim 9, wherein the transmission controller transmits a transmitter-side alarm signal to the management system when the optical signal is not normally inputted.

11. An optical receiving terminal in an optical communication system comprising a transmitting terminal and a management system connected to the transmitting terminal and the receiving terminal, comprising:

a demultiplexer for demultiplexing a received optical signal to produce the optical control signal and the optical signal;

a signal receiver for receiving the optical signal; and a reception controller for determining whether the optical signal is normally received by the signal receiver; and an alarm controller controlling such that, when the optical signal is not normally received by the signal receiver, transmission of a receiver-side alarm signal to the management system is controlled depending on whether the alarm information signal included in the optical control signal indicates that the optical signal has been normally inputted at the transmitting terminal, wherein, when the alarm information signal indicates that the optical signal has not been normally inputted at the transmitting terminal, the alarm controller suppresses transmission of the receiver-side alarm signal to the management system; and when the alarm information signal indicates that the optical signal has been normally inputted at the transmitting terminal, the alarm controller transmits the receiver-side alarm signal to the management system.

12. A computer-readable medium storing a program instructing a computer to perform alarm control for an optical communications network in which a transmitting terminal transmits an optical signal to a receiving terminal through an optical transmission line, the program comprising a transmission control section and a reception control section, wherein the transmission control section comprises the steps of:
  a) inputting an optical signal from a signal transmitter;
  b) producing an alarm information signal indicating whether the optical signal is normally inputted;
  c) transmitting the optical signal and an optical control signal including the alarm information signal to the receiving terminal through the optical transmission line;

the reception control section comprises the steps of:
  d) receiving the optical control signal and the optical signal from the transmitting terminal,
  e) determining whether the optical signal is normally received by a signal receiver; and
  f) when the optical signal is not normally received by the signal receiver, controlling transmission of a receiver-side alarm signal to a management system depending on whether the alarm information signal included in the optical control signal indicates that the optical signal has been normally inputted at the transmitting terminal, wherein the step (f) comprises the steps of:

when the alarm information signal indicates that the optical signal has not been normally inputted at the transmitting terminal, suppressing transmission of the receiver-side alarm signal to the management system; and when the alarm information signal indicates that the optical signal has been normally inputted at the transmitting terminal, transmitting the receiver-side alarm signal to the management system.

13. An alarm control method for an optical WDM (wavelength division multiplexing) communications network including a mananement system thereof, wherein a transmitting terminal transmits an optical WDM signal including a plurality of WDM channels to a receiving terminal through an optical transmission line, comprising the steps of:

at the transmitting terminal having a plurality of transmitters for producing a plurality of transmission signals on respective ones of the WDM channels,
  a) determining whether the transmission signals are normally inputted to a wavelength multiplexer;
  b) producing an alarm information signal indicating whether each of the transmission signals is normally inputted to the wavelength multiplexer; and c) multiplexing the plurality of transmission signals and a control signal including the alarm information signal to transmit them as an optical WDM signal to the receiving terminal through the optical transmission line;

at the receiving terminal having a plurality of receivers for receiving a plurality of reception signals on respective ones of the WDM channels, d) determining whether each of the reception signals is normally received by a corresponding receiver; and e) when a receiver corresponding to a WDM channel does not normally receive a reception signal, controlling transmission of a receiver-side alarm signal to the management system depending on whether the alarm information signal included in the control signal indicates that a transmission signal on the WDM channel has been normally inputted to the wavelength multiplexer at the transmitting terminal, wherein the receiver-side alarm signal indicates whether each of the WDM channels normally operates in the receiving terminal, wherein the alarm information signal comprises a plurality of alarm suppression flags each corresponding to the WDM channels, wherein the alarm suppression flags are inserted as one unit in a predetermined area of the control signal.

14. An alarm control method for an optical WDM (wavelength division multiplexing) communications network including a management system thereof, wherein a transmitting terminal transmits an optical WDM signal including a plurality of WDM channels to a receiving terminal through an optical transmission line, comprising the steps of:

at the transmitting terminal having a plurality of transmitters for producing a plurality of transmission signals on respective ones of the WDM channels, a) determining whether the transmission signals are normally inputted to a wavelength multiplexer;

b) producing an alarm information signal indicating whether each of the transmission signals is normally inputted to the wavelength multiplexer; and c) multiplexing the plurality of transmission signals and a control signal including the alarm information signal to transmit them as an optical WDM signal to the receiving terminal through the optical transmission line;

at the receiving terminal having a plurality of receivers for receiving a plurality of reception signals on respective ones of the WDM channels, d) determining whether each of the reception signals is normally received by a corresponding receiver; and e) when a receiver corresponding to a WDM channel does not normally receive a reception signal, controlling transmission of a receiver-side alarm signal to the management system depending on whether the alarm information signal included in the control signal indicates that a transmission signal on the WDM channel has been normally inputted to the wavelength multiplexer at the transmitting terminal, wherein the receiver-side alarm signal indicates whether each of the WDM channels normally operates in the receiving terminal, wherein the alarm information signal comprises a plurality of alarm suppression flags each corresponding to the WDM channels, wherein each of the alarm suppression flags is inserted in a corresponding one of consecutive frames of the control signal.

15. An optical WDM (wavelength division multiplexing) communication system comprising:

a transmitting terminal;
a receiving terminal; and
a management system connected to the transmitting terminal and the receiving terminal, wherein the transmitting terminal comprises:

a plurality of transmitters for producing a plurality of transmission signals on respective ones of multiple WDM channels;

a wavelength multiplexer for multiplexing the plurality of transmission signals and a control signal to transmit them as an optical WDM signal to the receiving terminal through an optical transmission line;

a monitor for determining whether the transmission signals are normally inputted to the wavelength multiplexer; and a transmission controller for producing an alarm information signal indicating whether each of the transmission signals is normally inputted to the wavelength multiplexer, wherein the alarm information signal is included in the control signal, the receiving terminal comprises:

a demultiplexer for demultiplexing the optical WDM signal to produce a received control signal and a plurality of reception signals on respective ones of the WDM channels;

a plurality of receivers for receiving respective ones of the reception signals;

a reception controller for determining whether each of the reception signals is normally received by a corresponding receiver; and an alarm controller controlling such that, when a receiver corresponding to a WDM channel does not normally receive a reception signal, transmission of a receiver-side alarm signal to the management system is controlled depending on whether the alarm information signal included in the received control signal indicates that a transmission signal on the WDM channel has been normally inputted to the wavelength multiplexer at the transmitting terminal, wherein the receiver-side alarm signal indicates whether each of the WDM channels normally operates in the receiving terminal, wherein the alarm information signal comprises a plurality of alarm suppression flags each corresponding to the WDM channels, wherein the alarm suppression flags are inserted as one unit in a predetermined area of the control signal.

16. An optical WDM (wavelength division multiplexing) communication system comprising:

a transmitting terminal;
a receiving terminal; and
a management system connected to the transmitting terminal and the receiving terminal, wherein the transmitting terminal comprises:

a plurality of transmitters for producing a plurality of transmission signals on respective ones of multiple WDM channels;

a wavelength multiplexer for multiplexing the plurality of transmission signals and a control signal to transmit them as an optical WDM signal to the receiving terminal through an optical transmission line;

a monitor for determining whether the transmission signals are normally inputted to the wavelength multiplexer; and a transmission controller for producing an alarm information signal indicating whether each of the transmission signals is normally inputted to the wavelength multiplexer, wherein the alarm information signal is included in the control signal, the receiving terminal comprises:

a demultiplexer for demultiplexing the optical WDM signal to produce a received control signal and a plurality of reception signals on respective ones of the WDM channels;

a plurality of receivers for receiving respective ones of the reception signals;

a reception controller for determining whether each of the reception signals is normally received by a corresponding receiver; and an alarm controller controlling such that, when a receiver corresponding to a WDM channel does not normally receive a reception signal, transmission of a receiver-side alarm signal to the management system is controlled depending on whether the alarm information signal included in the received control signal indicates that a transmission signal on the WDM channel has been normally inputted to the wavelength multiplexer at the transmitting terminal, wherein the receiver-side alarm signal indicates whether each of the WDM channels normally operates in the receiving terminal, wherein the alarm information signal comprises a plurality of alarm suppression flags each corresponding to the WDM channels, wherein each of the alarm suppression flags is inserted in a corresponding one of consecutive frames of the control signal.

* * * * *